M. M. ROBERTS.
STUFFING BOX.
APPLICATION FILED OCT. 19, 1920.

1,410,600.

Patented Mar. 28, 1922.

Inventor
M. M. Roberts,
E. D. Anderson Jr.
By
Attorney

UNITED STATES PATENT OFFICE.

MARION M. ROBERTS, OF ST. FRANCISVILLE, ILLINOIS, ASSIGNOR TO THE OHIO OIL COMPANY, OF FINDLAY, OHIO, A CORPORATION OF OHIO.

STUFFING BOX.

1,410,600.   Specification of Letters Patent.   Patented Mar. 28, 1922.

Application filed October 19, 1920. Serial No. 418,014.

*To all whom it may concern:*

Be it known that I, MARION M. ROBERTS, a citizen of the United States, resident of St. Francisville, in the county of Lawrence and State of Illinois, have made a certain new and useful Invention in Stuffing Boxes; and I declare the following to be a full, clear, and exact description of the same, such as will enable others, skilled in the art to which it appertains to make and use the invention, reference being had to the accompanying drawings, and to letters or figures of reference marked thereon, which form a part of this specification.

Figure 1:
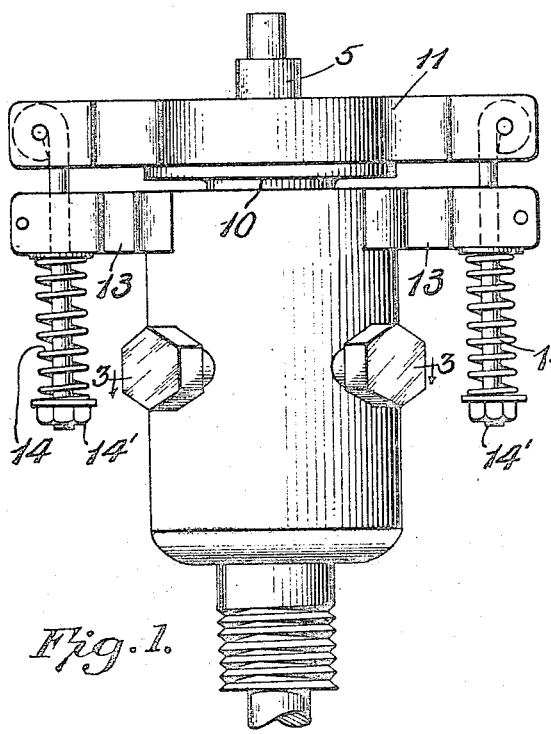
Figure 1 is a side view of the invention.
Figure 2:
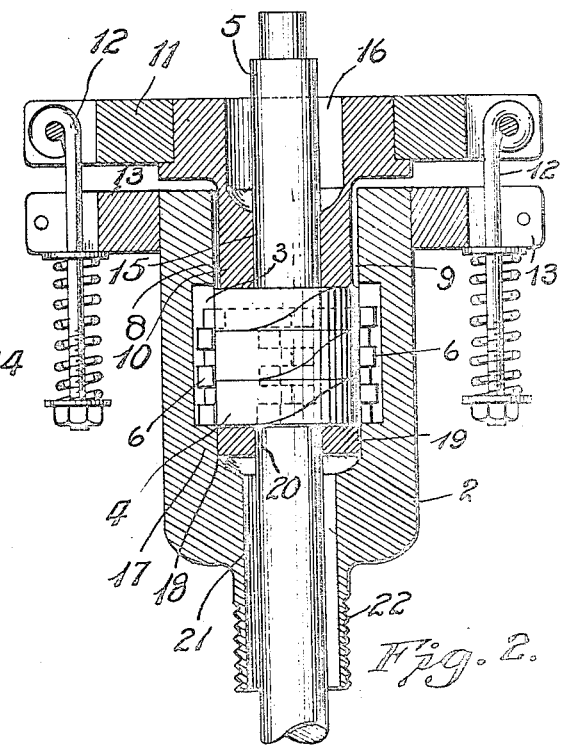
Figure 2 is a central vertical section of the same.
Figure 3:
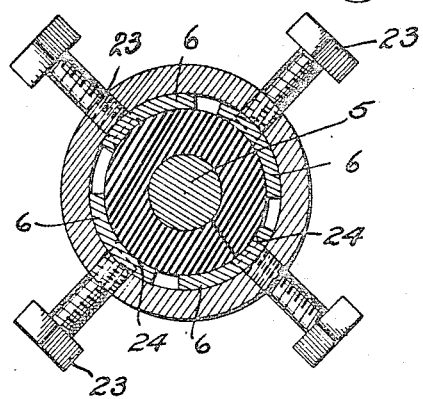
Figure 3 is a horizontal section through chamber 3, showing the members 6 in position of outermost radial adjustment.
Figure 4:
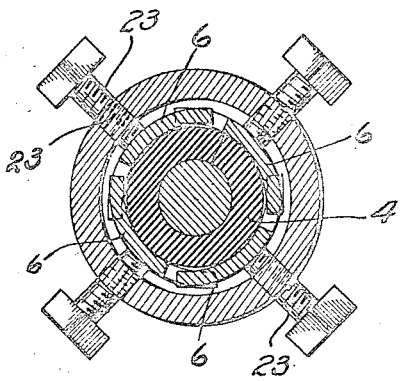
Figure 4 is a similar view with the members 6 adjusted inwardly.
Figure 6:
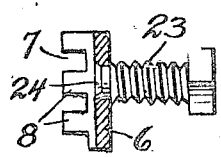
Figure 6 is a detail sectional view of a pressure section, with its adjusting screw.
Figure 5:
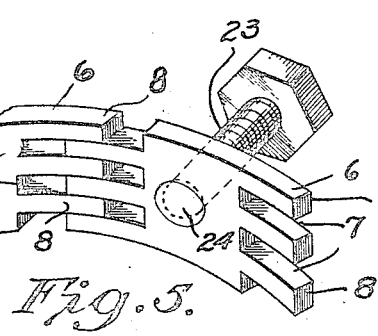
Figure 5 is a detail perspective view of one of the members 6, with a portion of an adjoining member engaged therewith.

The invention has relation to stuffing boxes, designed mainly for use in packing the piston or polish rods of the pistons of pumps used in pumping oil from oil wells.

An object of the invention is to extend the life of the rubber packing rings used in such stuffing boxes to a maximum degree. Other objects and advantages will appear.

In the accompanying drawings, illustrating an embodiment of the invention, the numeral 2 designates the barrel or casing of the box, provided with a chamber 3 wherein are located the rubber gaskets or rings 4 surrounding the piston or polish rod 5, extending longitudinally through said box. Surrounding the rubber rings are arcuate clutch or pressure sections 6, four in number as shown, and provided each at each end with a plurality of notches 7, forming tongues 8, the tongues of one section fitting and working in the notches of the adjacent section, the notches and tongues being sufficiently long to allow the pressure sections to be closed in upon the gaskets to a sufficiently small circle to admit of maximum wear of said gaskets.

The upper portion of the casing 2 is provided with an inward extending flange 8, of a breadth about equal to that of the pressure sections 6, and is also provided with a bore or aperture 9 wherein loosely fits the gland or pressure lug 10 of the cross bar 11, said cross bar having adjustable bolt connections 12 with lugs 13 of the casing 2, springs 14 being shown as surrounding said bolts and bearing upon the lugs 13, and being designed to be put under tension by the adjustment of the nuts 14' of said bolts. These springs, however, may be omitted, and form no necessary part of my invention, which operates well without the same.

The gland or pressure lug 10 is provided with a lower bore or aperture 15, wherein the polish rod closely works, and with an upper cup 16, wherein any oil following the polish rod in its working will collect and be prevented from escaping and spreading upon the pump and adjacent ground. The pressure gland or lug 10 is of such limited length that it is prevented from ever bearing upon the arcuate pressure sections 6, whereby the free action of said sections radially inward and outward is always possible.

The bottom of the casing 2 is provided with an inward extending shoulder 17, having a seat 18 wherein fits a bearing block 19, having an aperture 20 wherein the polish rod closely fits and works, said bottom being provided with an aperture 21 which is larger than the polish rod. The bottom of the casing 2 terminates in a nipple 22, threaded for connection with the tubing in the oil well, the stuffing box being located above ground. The block 19 is removable and replaceable by a new block when worn.

The arcuate pressure sections 6 are movable radially inward and outward by means of radial screws 23, each having at its inner end a reduced seat portion terminating in an enlarged head 24, providing a positive connection with its respective section but allowing the screw to revolve therein. When these sections are retracted to the limit of their movement outward they are located within the peripheral portion of the chamber of the casing, bounded at the top by the flange 8 and at the bottom by the flange 17, whereby said sections are protected from injury in pulling a well, or pulling the polish rod out and letting it in the well, this being an important feature of the invention. The positive connection of the radial screws with the arcuate sections is of course necessary, to enable the sections to be positively withdrawn outward to the aforesaid protected location.

It is found in practice that the rubber gaskets or rings become useless to perform their function when they have become only slightly thinned or worn, and applicant has discovered that by using a combination of endwise pressure by the gland or pressure lug 10, and transverse pressure by the arcuate sections 6, he is enabled to have these rubber rings or gaskets perform their function to make a fluid-tight box until they have become entirely worn out, or reduced to a very thin ring.

I claim:

A stuffing box for the polish rods of oil well pumps and the like, comprising a casing having a chamber and a top flange overlying the peripheral portion of said chamber and a bottom flange underlying said peripheral portion, a plurality of rubber gaskets in said chamber, means of adjustment therefor to compress said gaskets longitudinally, and adjustable means for compressing said gaskets radially and transversely independent of said first named means and consisting of a series of arcuate pressure sections having each a radial adjustment screw revolubly and positively connected thereto, said sections being capable of withdrawal within said peripheral portion of the casing.

In testimony whereof I affix my signature in presence of two witnesses.

MARION M. ROBERTS.

Witnesses:
 ALICE QUICK,
 ANNIE SNYDER.